June 9, 1942.  J. BIJUR  2,285,407
LUBRICATION
Filed May 14, 1940
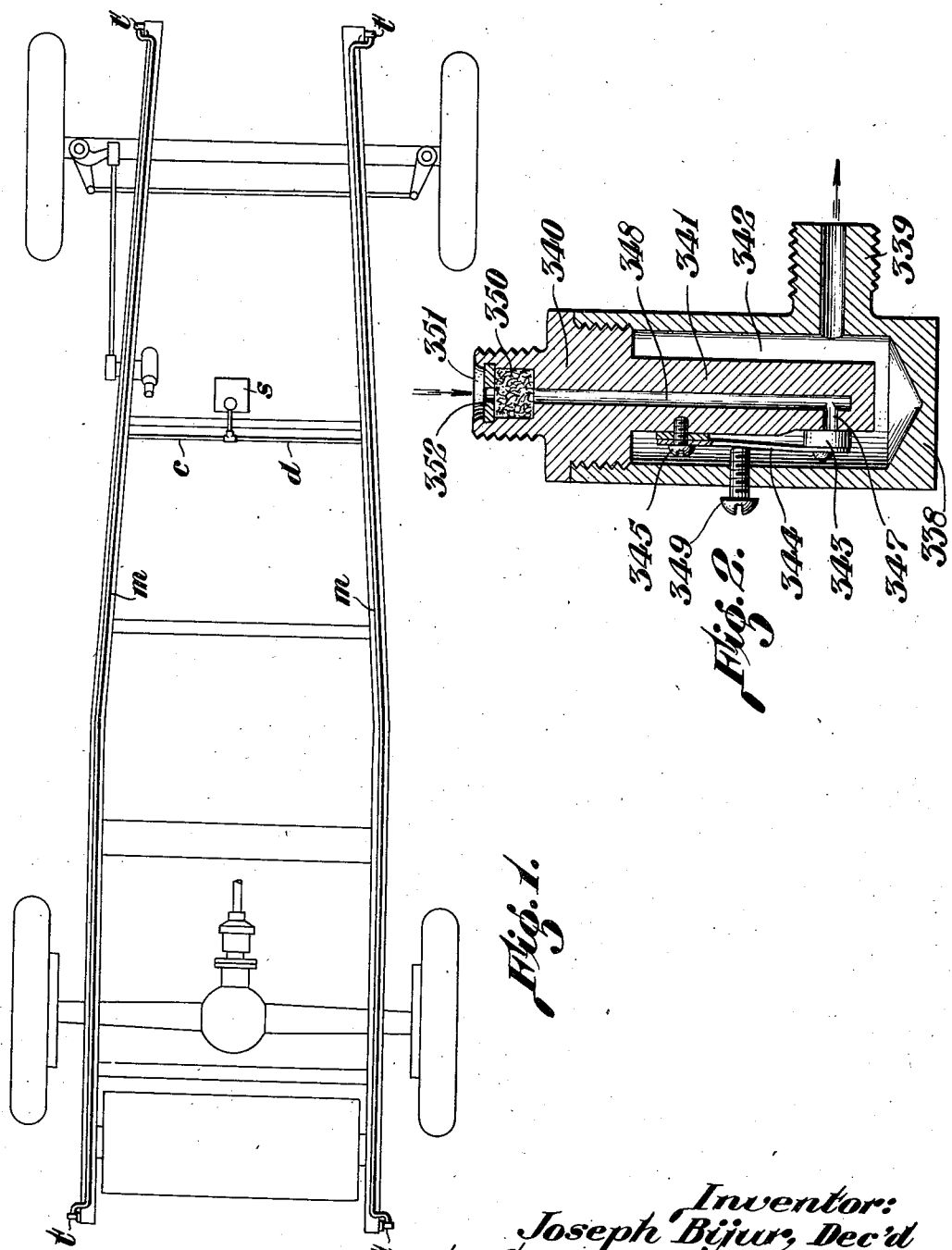
Inventor:
Joseph Bijur, Dec'd
by George Bijur, Executor,
by Dewn, Fairbanks & Hirsch
Attorneys.

Patented June 9, 1942

2,285,407

UNITED STATES PATENT OFFICE 2,285,407

LUBRICATION

Joseph Bijur, deceased, late of New York, N. Y., by George Bijur, executor, New York, N. Y., assignor to Auto Research Corporation, a corporation of Delaware Application May 14, 1940, Serial No. 335,112

4 Claims. (Cl. 184—7)

The present invention relates primarily to central lubrication and is more especially concerned with valving and/or metering high restriction flow control devices, for example, of the general type disclosed in issued Patent No. 1,632,772 of June 14, 1927, and sometimes known as "drip plugs," the flow rating of which is not subject to fortuitous variation.

As is set forth in said Patent No. 1,632,772, these drip plugs are positioned at the outlets of a branched distributing tubing system, which is substantially completely filled with lubricant and which has such a small bore as not to permit reverse flow of air and lubricant. The outlets, each of which are provided with a high restriction flow metering outlet fitting, having a tremendously greater restricting effect than the tubings or the bearings so as to predominantly effect the proportionment of lubricant, may be positioned at relatively remote from or relatively near to the central pump and pressure source and they may be mounted on or connected to the bearings by tail pipes.

In designing flow metering devices of the flow restriction type disclosed in Patent No. 1,632,772, it is customary to provide separate valve and restriction elements, the restriction end being preferably relatively fixed in position and the valve being positioned in an outlet socket and enclosed between a valve seat and a valve retainer. The socket may be a large one to receive a coil spring for seating the valve, or a relatively small one with springless valves.

It is an object of the present invention, however, to provide a flow metering device or drip plug of the type above described in which the valve and the restriction shall constitute one unit and in which the valve and drip plug may move together and/or be retained in a single cavity or enclosed in the drip plug fitting.

Another object is to provide a flow metering device or drip plug fitting of the type above described, the flow restricting effect of the valve being correlated with the flow restricting effect of the restriction to give a unit of a desired rating.

The objects of the present invention are accomplished either by forming a restriction around the edge of the valve so that the lubricant will both have to unseat the valve and will be restricted in flowing around or under the valve when it is forced through the drip plug under pressure.

This application is a continuation in part of copending application Serial No. 580,668, filed August 9, 1922, now Patent No. 1,975,920, through intervening application Serial No. 747,497, filed October 9, 1934, now Patent Number 2,219,290.

In the accompanying drawing in which are shown one or more of various possible embodiments of the several features of the invention, Fig. 1 is a diagrammatic view indicating the application of the fitting to a chassis; and Fig. 2 is a transverse sectional view on a larger scale showing the construction of one embodiment of the fitting.

Referring now to the drawing, in Fig. 1 there is shown diagrammatically the general layout of the chassis of an automobile having a lubricant supply unit S, illustratively on the dashboard. The distributing system includes headers $c$ and $d$, which communicate at their ends with the respective mains $m$ extending the length of the channel frames and feeding various bearings at or near which the drip plug terminals $t$ are applied. Bridging conduits (not shown) are provided leading to similar drip plugs (not shown) at or near the corresponding bearings on the axle or other unsprung parts.

Since in the device of Fig. 2 the seepage resistance in operation assists in maintaining the valve open, it is feasible with a given pump discharge pressure, to use a stronger valve seating spring than in embodiments in which the seepage resistance does not coact in operation to hold the valve from its seat.

It is, of course, understood that the construction described may be used on any lubricating line or the installation may be equipped at various parts with fittings of different design. It will also be understood that the various distinctive parts of various fittings may be in many cases interchangeably used in other forms of fittings.

The fitting of Fig. 2 is closed at one end 338 and has an integral nipple 339 for application to the bearing or bolt. A metal plug 340 is threaded into the open end of said fitting and has a shank 341 within the chamber 342. A valve 343 mounted upon one end of a leaf spring 344, the other end of which is secured by means of a screw 345 to the shank 341 of the plug, closes the cross passage 347 communicating with the axial duct 348 through the plug. The leaf spring is preferably set to urge the valve closed with a substantial minimum pressure and screw 349 accessible from the exterior of the fitting affords additional adjustable valve seating pressure. A filter plug 350 is preferably seated within a depression 351 in the end of plug 340 and is maintained in place by a spring washer 352 snapped into a corresponding groove.

The leaf spring 344 and screw 349 exert a valve seating pressure of such magnitude that the lubricant forced past the filter plug into the seepage fitting by the operation of the pump will unseat the valve but slightly to leave but a minute crack between the valve and its seat, affording a highly constricted passage for the lubricant, the pressure being frictionally absorbed as the oil oozes slowly therethrough. The slow feed of lubricant takes place until the counterpressure of the spring and screw overcome the pressure in the line when the valve 343 closes to prevent further exit of lubricant. Adjustment of flow to any bearing can be effected through screw 349.

It will be seen that valve 343 also performs the combined function of a seepage resistance to absorb the pressure in the lubricant, and a valve to prevent leak of oil or entry of air.

The flow metering device of the present application is designed to be utilized in flow metering systems having a central pump either continuously or intermittently feeding the system with the amount of lubricant required, which pump may be automatically actuated as by the intake manifold vacuum, and inertia weight, direct mechanical drive, and by other arrangements. The outlet fittings should preferably have a predominating restricting effect, as compared to the piping line and the bearings, the preferred drip plug devices having a restricting effect ranging between 50 to 200 the restricting effect of the longest line and the tightest bearing, an exact rating of which outlet device being controlled to, proportion the correct amount of lubricant to the bearing to which it is connected.

Fig. 2 of the present application corresponds to Fig. 7 of application Serial No. 747,497, filed October 9, 1934, and to Fig. 26 of application Serial No. 580,668, now Patent No. 1,975,920 and Fig. 1 is a simplified showing of and is based on Fig. 1 of said application Serial No. 580,668, now Patent No. 1,975,920.

By the expression "drip plug" as utilized in the specification and accompanying claims is meant a high restriction metering fitting which affords a substantial constant obstructing effect much higher than the obstructing effect of the piping or tubing and the bearings and which will substantially prevent lubricant flow except under applied pressure. These obstructing devices usually consist of fittings provided with central flow passages which are obstructed by filler members affording a very small crevice or capillary passages through which the lubricant must flow in passing to the bearing.

What is claimed is:

1. In a high restriction flow metering outlet, lubricant distributing system having a central lubricant reservoir and pump and a substantially completely lubricant-filled branched distributing piping system having a small bore insufficient to permit counter-current flow of air and lubricant and leading to a plurality of spaced and distributed bearings to receive small, yet accurately proportioned, quantities of lubricant, a high restriction flow metering fitting having a tremendously greater restricting effect than the piping system and the bearings so as in itself to predominantly control the proportionment of lubricant comprising a valve, a seat for said valve, resilient means pressing said valve against said seat and adjustable means to regulate the seating pressure of said spring, said valve serving both to check return flow and restricting forward flow to a predetermined degree, one of said fittings being provided for each branch of the system leading to a bearing to be lubricated, and said fitting offering a substantially constant restricting effect without variation due to variation in pressure of the lubricant supplied to said system by said pump.

2. In a high restriction flow metering outlet, lubricant distributing system having a central lubricant reservoir and pump and a substantially completely lubricant-filled branched distributing piping system having a small bore insufficient to permit counter-current flow of air and lubricant and leading to a plurality of spaced and distributed bearings to receive small, yet accurately proportioned, quantities of lubricant, a high restriction flow metering fitting having a tremendously greater restricting effect than the piping system and the bearings so as in itself to predominantly control the proportionment of lubricant comprising a valve, a seat for said valve, resilient means pressing said valve against said seat and adjustable means to regulate the seating pressure of said spring, said valve serving both to check return flow and restricting forward flow to a predetermined degree, said resilient means including a leaf spring, one of said fittings being provided for each branch of the system leading to a bearing to be lubricated, and said fitting offering a substantially constant restricting effect without variation due to variation in pressure of the lubricant supplied to said system by said pump.

3. In a high restriction flow metering outlet, lubricant distributing system having a central lubricant reservoir and pump and a substantially completely lubricant-filled branched distributing piping system having a small bore insufficient to permit counter-current flow of air and lubricant and leading to a plurality of spaced and distributed bearings to receive small, yet accurately proportioned, quantities of lubricant, a high restriction flow metering fitting having a tremendously greater restricting effect than the piping system and the bearings so as in itself to predominantly control the proportionment of lubricant, said fitting comprising an elongated body having an inlet and a longitudinal bore fed therefrom and an inlet strainer, a shell enclosing said body, a cap closing the outlet of said bore, a resilient member pressing down on said cap and adjusting means to adjust said resilient member, one of said fittings being provided for each branch of the system leading to a bearing to be lubricated, and said fitting offering a substantially constant restricting effect without variation due to variation in pressure of the lubricant supplied to said system by said pump.

4. In a high restriction flow metering outlet, lubricant distributing system having a central lubricant reservoir and pump and a substantially completely lubricant-filled branched distributing piping system having a small bore insufficient to permit counter-current flow of air and lubricant and leading to a plurality of spaced and distributed bearings to receive small, yet accurately proportioned, quantities of lubricant, a high restriction flow metering fitting having a tremendously greater restricting effect than the piping system and the bearings so as in itself to predominantly control the proportionment of lubricant, said fitting comprising an elongated body having an inlet and a longitudinal bore fed therefrom and an inlet strainer, a shell enclosing said body, a cap closing the outlet of said bore, a resilient member pressing down on said cap and adjusting means to adjust said resilient member, said resilient member consisting of a leaf spring carried by said body and said adjusting means consisting of a screw to adjust tension on said leaf spring, one of said fittings being provided for each branch of the system leading to a bearing to be lubricated, and said fitting offering a substantially constant restricting effect without variation due to variation in pressure of the lubricant supplied to said system by said pump.

GEORGE BIJUR,
*Executor of the Estate of Joseph Bijur, Deceased.*